US008818574B2

(12) United States Patent
Fukui et al.

(10) Patent No.: US 8,818,574 B2
(45) Date of Patent: Aug. 26, 2014

(54) AIRCRAFT CONTROL APPARATUS AND AIRCRAFT CONTROL SYSTEM

(71) Applicants: NABTESCO Corporation, Tokyo (JP); BAE Systems Controls, Inc., Endicott, NY (US)

(72) Inventors: Atsushi Fukui, Gifu (JP); Atsushi Mori, Gifu (JP); Steven Bessette, Johnson City, NY (US); Gary Ellsworth, Endicott, NY (US); Dino Gianisis, Binghamton, NY (US)

(73) Assignees: NABTESCO Corporation, Tokyo (JP); BAE Systems Controls, Inc., Endicott, NY (US)

( * ) Notice: Subject to any disclaimer, the term of this patent is extended or adjusted under 35 U.S.C. 154(b) by 0 days.

(21) Appl. No.: 13/678,284

(22) Filed: Nov. 15, 2012

(65) Prior Publication Data
US 2013/0124019 A1 May 16, 2013

Related U.S. Application Data

(60) Provisional application No. 61/560,540, filed on Nov. 16, 2011.

(51) Int. Cl.
*G01C 23/00* (2006.01)

(52) U.S. Cl.
USPC ...... 701/3; 701/32.9; 701/34.3; 714/E11.008; 714/E11.064

(58) Field of Classification Search
USPC ........... 701/3, 29.1, 32.9, 34.3; 714/E11.008, 714/E11.064
See application file for complete search history.

(56) References Cited

U.S. PATENT DOCUMENTS

| 4,115,847 | A | * | 9/1978 | Osder et al. | 700/4 |
| 5,493,497 | A | | 2/1996 | Buus | |
| 5,550,736 | A | * | 8/1996 | Hay et al. | 701/3 |
| 2006/0200278 | A1 | * | 9/2006 | Feintuch | 701/3 |
| 2009/0031198 | A1 | * | 1/2009 | Johansson | 714/799 |
| 2010/0084517 | A1 | * | 4/2010 | Benson et al. | 244/228 |

OTHER PUBLICATIONS

M. Sghairi et al.; "Challenges in Building Fault-Tolerant Flight Control System for a Civil Aircraft"; IAENG International Journal of Computer Science, 35:4, IJCS 35 4 07; Nov. 20, 2008.

* cited by examiner

*Primary Examiner* — Russell Frejd
(74) *Attorney, Agent, or Firm* — Studebaker & Brackett PC

(57) ABSTRACT

A plurality of control channels each include a power supply, an interface that receives a manipulation signal, an arithmetic processing portion that calculates and generates an operation command signal for actuators based on the manipulation signal, and a signal determination unit that determines a control signal for finally controlling the operation of the actuators and outputs the control signal. The arithmetic processing portions respectively provided in the plurality of control channels have designs different from one another. Each of the signal determination units determines the control signal by receiving a first operation command signal generated by the arithmetic processing portion of the control channel in which that signal determination unit is provided, and a second operation command signal generated in the arithmetic processing portion of another of the control channels, and comparing the first operation command signal and the second operation command signal, and outputs the control signal.

5 Claims, 5 Drawing Sheets

AIRCRAFT CONTROL APPARATUS AND AIRCRAFT CONTROL SYSTEM

BACKGROUND OF THE INVENTION

1. Field of the Invention

The present invention relates to an aircraft control apparatus that controls a plurality of actuators that drive a device installed in an aircraft, and an aircraft control system that includes the aircraft control apparatus and the plurality of actuators.

2. Description of Related Art

As an aircraft control apparatus that controls a plurality of actuators that drive a device installed in an aircraft, U.S. Pat. No. 5,493,497 discloses an aircraft control apparatus that controls a plurality of actuators that drive control surfaces serving as the above-stated device. The aircraft control apparatus disclosed in U.S. Pat. No. 5,493,497 includes a plurality of control channels that control a plurality of actuators, each control channel including a power supply for supplying power. By including a plurality of control channels in this way, the aircraft control apparatus is intended to ensure the redundancy that enables the control surface to be driven and allows the operation of the control surface to be safely continued even if a failure has occurred in any of the control channels.

Also, each of the control channels of the above-described aircraft control apparatus includes a primary flight computer as an arithmetic processing unit. The primary flight computer receives, via an actuator control electronics serving as another electronic apparatus, a manipulation signal generated based on a manipulation of a wheel or the like performed by a pilot flying the aircraft. Based on the above-described manipulation signal, the primary flight computer calculates and generates an operation command signal for commanding and controlling the operation of the actuators that drive the control surfaces.

As stated above, by including a plurality of control channels, the above-described aircraft control apparatus is intended to ensure the redundancy that allows the operation of the control surfaces to be safely continued. However, if a failure has occurred in a primary flight computer, the control channel in which that primary flight computer is provided becomes also inoperable.

In the event of occurrence of a generic failure, that is, a failure that may occur commonly among the same pieces of software or hardware when primary flight computers having the same design are provided in a plurality of control channels, all of the control channels become inoperable. Therefore, although not disclosed in U.S. Pat. No. 5,493,497, for the aircraft control apparatus, a plurality of arithmetic processing portions having different designs need to be provided in the above-described primary flight computer of each of the control channels.

In this regard, the apparatus configuration of a primary flight control including a plurality of arithmetic processing portions having different designs is disclosed in FIG. 3 of the publication entitled "Challenges in Building Fault-Tolerant Flight Control System for a Civil Aircraft" published in "IAENG International Journal of Computer Science, 35:4, IJCS_35_4_07". Note that the above publication has been released on the Internet at the following URL: "http://www.i-aeng.org/IJCS/issues_v35/issue_4/IJCS_35_4_07.pdf".

The above-described publication discloses the configuration of a primary flight control that is provided in each of a plurality of control channels that control a plurality of actuators. Also, the primary flight control receives a manipulation signal generated based on a manipulation performed by a pilot, and includes a plurality of arithmetic processing portions having different designs as arithmetic processing portions that generate an operation command signal for commanding and controlling the operation of the actuators. Specifically, the above-described publication discloses a configuration in which three arithmetic processing portions ("MICRO-PROCESSOR AMD 29050", "MICRO-PROCESSOR MOTOROLA 68040", "MICRO-PROCESSOR INTEL 80486") having different designs manufactured by different manufacturers are provided in each primary control.

SUMMARY OF THE INVENTION

As described above, a plurality of arithmetic processing portions having designs different from one another is provided in each of a plurality of control channels that control a plurality of actuators, thus ensuring the redundancy that allows the operation of a device installed in an aircraft to be safely continued.

However, in conventional aircraft control apparatuses, a plurality of arithmetic processing portions having different designs are provided in each of the control channels, resulting in an increase in the number of arithmetic processing portions. That is, the aircraft control apparatus as a whole needs to include the number of arithmetic processing portions obtained by multiplying the number of the control channels by the number of arithmetic processing portions provided in each of the control channels. Further, an increase in the number of the arithmetic processing portions also leads to an increase in the complexity and the costs of the configuration.

In view of the foregoing circumstances, it is an object of the present invention to provide an aircraft control apparatus for which the redundancy that allows the operation of a device installed in an aircraft to be safely continued can be ensured and whose configuration can be simplified with a reduced number of arithmetic processing portions. It is another object of the invention to provide an aircraft control system that includes the aircraft control apparatus and the plurality of actuators.

According to a first feature of an aircraft control apparatus of the present invention for achieving the above-described objects, there is provided an aircraft control apparatus that controls a plurality of actuators that drive a device installed in an aircraft, the apparatus including: a plurality of control channels that control the plurality of actuators and each include a power supply for supplying power, wherein all of the plurality of control channels or part of the plurality of control channels each include: an interface that receives a manipulation signal generated, based on a manipulation of a pilot flying the aircraft, by a manipulation input unit into which a manipulation of the aircraft performed by the pilot is input; an arithmetic processing portion that calculates and generates, based on the manipulation signal received via the interface, an operation command signal for commanding and controlling operation of the actuators that drive the device, a signal determination unit that determines, based on the operation command signal generated by the arithmetic processing portion and another signal, a control signal serving as a signal for finally controlling operation of the actuators, and outputs the control signal, the arithmetic processing portions respectively provided in the plurality of control channels have designs different from one another, and each of the signal determination units respectively provided in the plurality of control channels receives a first operation command signal, which is the operation command signal generated by the arithmetic processing portion provided in the control channel in which that signal determination unit is provided, and a second operation command signal, which is the operation command signal generated by the arithmetic processing portion provided in another of the control channels different from the control channel in which that signal determination unit is provided, determines the control signal by comparing the first operation command signal and the second operation command signal serving as the other signal, and outputs the control signal.

With this configuration, all or part of the plurality of control channels are respectively provided in one-to-one correspondence with the arithmetic processing portions having designs different from one another. Also, in the control channels, each of the signal determination units determines a control signal by comparing the first operation command signal from the arithmetic processing portion of the control channel in which that signal determination unit is provided and the second operation command signal from the arithmetic processing portion of another of the control channels, and outputs the determined control signal. Accordingly, even if the arithmetic processing portion of any of the control channels has failed, the signal determination unit provided in the control channel whose processing portion has failed can determine a control signal based on the operation command signal from the arithmetic processing portion of another of the control channels, and output the determined control signal. Then, the occurrence of a generic failure that may occur commonly among the same pieces of software or hardware can also be prevented. This prevents a situation where the control channel whose processing portion has failed becomes inoperable. Thus, the redundancy that allows the operation of a device installed in an aircraft to be safely continued can be ensured. With the above-described configuration, the control channels are respectively provided in one-to-one correspondence with the arithmetic processing portions having designs different from one another, and therefore it is possible to significantly reduce the number of the arithmetic processing portion as the aircraft control apparatus as a whole. Furthermore, this can simplify the configuration of the aircraft control apparatus, thus achieving a further reduction in the manufacturing costs.

Therefore, with the above-described configuration, it is possible to provide an aircraft control apparatus for which the redundancy that allows the operation of a device installed in an aircraft to be safely continued can be ensured and whose configuration can be reduced with a decreased number of the arithmetic processing portions.

According to a second feature of an aircraft control apparatus of the present invention, in the aircraft control apparatus of the first feature, three or more control channels are provided, the arithmetic processing portion being provided in each of the three or more control channels.

With this configuration, three ore more control channels are provided, with the arithmetic processing portions being provided in each of the three control channels, and therefore the aircraft control apparatus is provided with at least three arithmetic processing portions having designs different from one another. Therefore, even if any of the arithmetic processing portions has failed, the signal determination unit can determine a control signal by comparing the operation command signals generated by the remaining two arithmetic processing portions, and output the determined control signal. Accordingly, it is possible to further increase the reliability of the aircraft control apparatus.

According to a feature of an aircraft control system of the present invention, there is provided an aircraft control system including the aircraft control apparatus of the first or second feature, and a plurality of actuators that are controlled by the aircraft control apparatus and that drive a device installed in an aircraft.

With this configuration, it is possible to provide an aircraft control system for which the redundancy that allows the operation of a device installed in an aircraft to be safely continued can be ensured and whose configuration can be simplified with a reduced number of arithmetic processing portions.

It should be appreciated that the above and other objects, and features and advantages of the present invention will become apparent from the following description taken in conjunction with the accompanying drawings.

DETAILED DESCRIPTION OF THE INVENTION

Hereinafter, an embodiment for carrying out the present invention will be described with reference to the accompanying drawings. The embodiment of the present invention is widely applicable as an aircraft control apparatus that controls a plurality of actuators that drive a device installed in an aircraft, and an aircraft control system that includes the aircraft control apparatus and the plurality of actuators.

Figure 1:
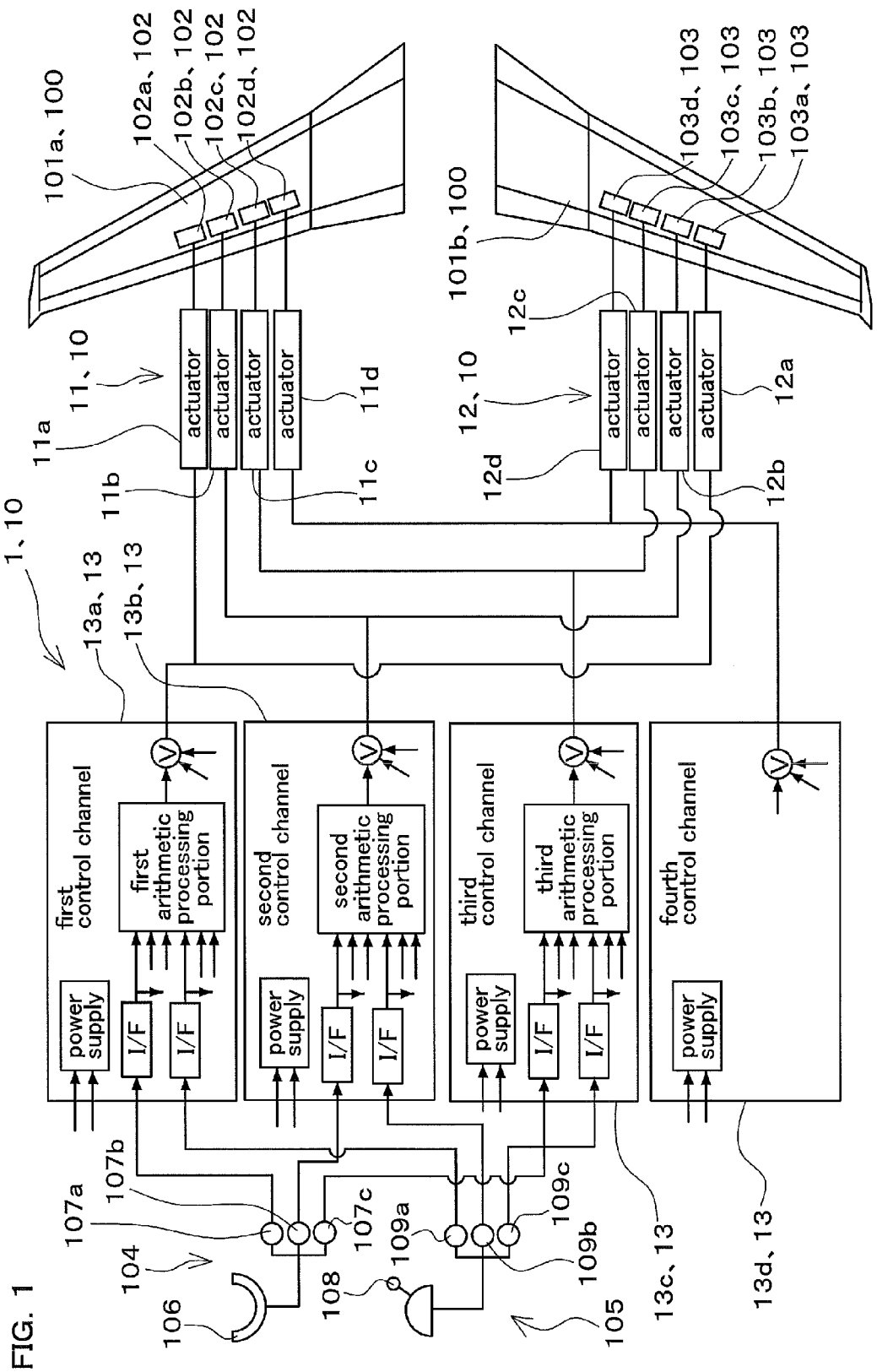
FIG. 1 is a block diagram showing an aircraft control apparatus and an aircraft control system according to one embodiment of the present invention.

FIG. 1 is a block diagram showing an aircraft control apparatus 1 and an aircraft control system 10 according to one embodiment of the present invention. The aircraft control apparatus 1 is configured as an apparatus that controls a plurality of actuators (11, 12) that drive flight spoilers (102, 103) serving as moving surfaces installed in an aircraft 100. The flight spoilers (102, 103) each constitute a device according to this embodiment that is installed in the aircraft. The aircraft control system 10 is configured as a system that includes the aircraft control apparatus 1 and the plurality of actuators (11, 12) that drive the flight spoilers (102, 103) by being controlled by the aircraft control apparatus 1. The aircraft control apparatus 1 and the aircraft control system 10 are mounted to the aircraft 100, and configured as an FBW (Fly by Wire) flight control apparatus and an FBW flight control system that control the operation of the flight spoilers (102, 103) via electric signals.

Note that only part of the aircraft 100, namely main wings (101a, 101b) are schematically shown in FIG. 1. The flight spoilers (102, 103) are provided as moving surfaces (flight control surfaces) installed at the main wings (101a, 101b). Although this embodiment is described, taking, as an example, the flight spoilers serving as moving surfaces as the devices to which the aircraft control apparatus 1 and the aircraft control system 10 are applied, this need not be the case; the present invention may be applied to another device. For example, this embodiment may be applied also to a ground spoiler, or an aileron, a rudder, an elevator, or the like serving as a moving surface constituting a control surface. Alternatively, this embodiment may be applied also to a leg of the aircraft (a mechanism supporting the body of the aircraft on the ground) such as a landing gear (undercarriage) as an example of another device.

The actuators (11, 12) that drive the flight spoilers (102, 103) may be provided, for example, as mechanisms including a hydraulic cylinder, and the operation of the actuators (11, 12) is controlled by supply and discharge of pressure oil based on control signals from the aircraft control apparatus 1. Note that it is also possible to implement a configuration in which the aircraft control apparatus 1 controls actuators provided as electric actuators.

In this embodiment, four actuators 11 (11a, 11b, 11c, 11d) are provided, and they are configured to respectively drive four flight spoilers 102 (102a, 102b, 102c, 102d) provided at one of the main wings, namely the main wing 101a. The actuators 11 are provided such that the actuator 11a drives the flight spoiler 102a, the actuator 11b drives the flight spoiler 102b, the actuator 11c drives the flight spoiler 102c, and the actuator 11d drives the flight spoiler 102d.

Four actuators 12 (12a, 12b, 12c, 12d) are provided, and they are configured to respectively drive four flight spoilers 103 (103a, 103b, 103c, 103d) provided at the other main wing 101b. The actuators 12 are provided such that the actuator 12a drives the flight spoiler 103a, the actuator 12b drives the flight spoiler 103b, the actuator 12c drives the flight spoiler 103c, and the actuator 12d drive the flight spoiler 103d.

The actuator 11a and the actuator 12a are controlled so as to correspond to each other as a pair, and thereby the flight spoiler 102a and the flight spoiler 103a are driven at the same timing so as to correspond to each other as a pair. The actuator 11b and the actuator 12b are controlled so as to correspond to each other as a pair, and thereby the flight spoiler 102b and the flight spoiler 103b are driven at the same timing so as to correspond to each other as a pair. The actuator 11c and the actuator 12c are controlled so as to correspond to each other as a pair, and thereby the flight spoiler 102c and the flight spoiler 103c are driven at the same timing so as to correspond to each other as a pair. The actuator 11d and the actuator 12d are controlled so as to correspond to each other as a pair, and thereby the flight spoiler 102d and the flight spoiler 103d are driven at the same timing so as to correspond to each other as a pair.

Next, the aircraft control apparatus 1 will be described in detail. The aircraft control apparatus 1 includes a plurality of control channels 13 (13a, 13b, 13c, 13d) that control the plurality of actuators (11, 12). The control channels 13 are each provided, for example, as an apparatus configured by incorporating various electronic devices and the like in a casing. Also, the control channels 13 each include a power supply for supplying control power to the various electronic devices in the casing and the corresponding actuators (11, 12). In this embodiment, four control channels 13 are provided, namely a first control channel 13a, a second control channel 13b, a third control channel 13c, and a fourth control channel 13d.

The first control channel 13a is provided as a control channel that controls the actuators (11a, 12a) that drive the flight spoilers (102a, 103a). The second control channel 13b is provided as a control channel that controls the actuators (11b, 12b) that drive the flight spoilers (102b, 103b). The third control channel 13c is provided as a control channel that controls the actuators (11c, 12c) that drive the flight spoilers (102c, 103c). The fourth control channel 13d is provided as a control channel that controls the actuator (11d, 12d) that drives the flight spoilers (102d, 103d). Although this embodiment is described, taking, as an example, a configuration in which each control channel controls a plurality of (in this embodiment, two) actuators, this need not be the case. It is also possible to implement a configuration in which each control channel controls one actuator or a plurality of three or more actuators.

The control channels 13 (13a, 13b, 13c, 13d) are configured to receive a manipulation signal generated, based on a manipulation performed by a pilot (not shown) flying the aircraft 100, by manipulation input units (104, 105) into which a manipulation of the aircraft 100 performed by the pilot is input. Also, the control channels 13 (13a, 13b, 13c, 13d) control their corresponding actuators (11, 12) based on the above-described manipulation signal.

Note that the manipulation input unit 104 includes a wheel 106 and position sensors (107a, 107b, 107c) in this embodiment. The wheel 106 is used by the pilot to manipulate the operation of the flight spoilers (102, 103) during flight or landing of the aircraft 100. The position sensors (107a, 107b, 107c) are provided as sensors each capable of independently detecting the amount of manipulation of the wheel 106 performed by the pilot. By the pilot manipulating the wheel 106, a manipulation signal corresponding to the amount of manipulation of the wheel 106 is output from each of the position sensors (107a, 107b, 107c). Thus, the redundancy that allows the detection of the amount of manipulation of the wheel 106 to be safely continued is ensured for the position sensors (107a, 107b, 107c) of the manipulation input unit 104 even if a failure has occurred in any of these position sensors.

The manipulation input unit 105 includes a speed brake lever 108 and position sensors (109a, 109b, 109c). The speed brake lever 108 is used by the pilot to manipulate the operation of the flight spoilers (102, 103) during landing of the aircraft 100. The position sensors (109a, 109b, 109c) are provided as sensors each capable of independently detecting the amount of manipulation of the speed brake lever 108 performed by the pilot. By the pilot manipulating the speed brake lever 108, a manipulation signal corresponding to the amount of manipulation of the speed brake lever 108 is output from each of the position sensors (109a, 109b, 109c). Thus, the redundancy that allows the detection of the amount of manipulation of the speed brake lever 108 to be safely continued is ensured for the position sensors (109a, 109b, 109c) of the manipulation input unit 105 even if a failure has occurred in any of these position sensors.

Figure 2:
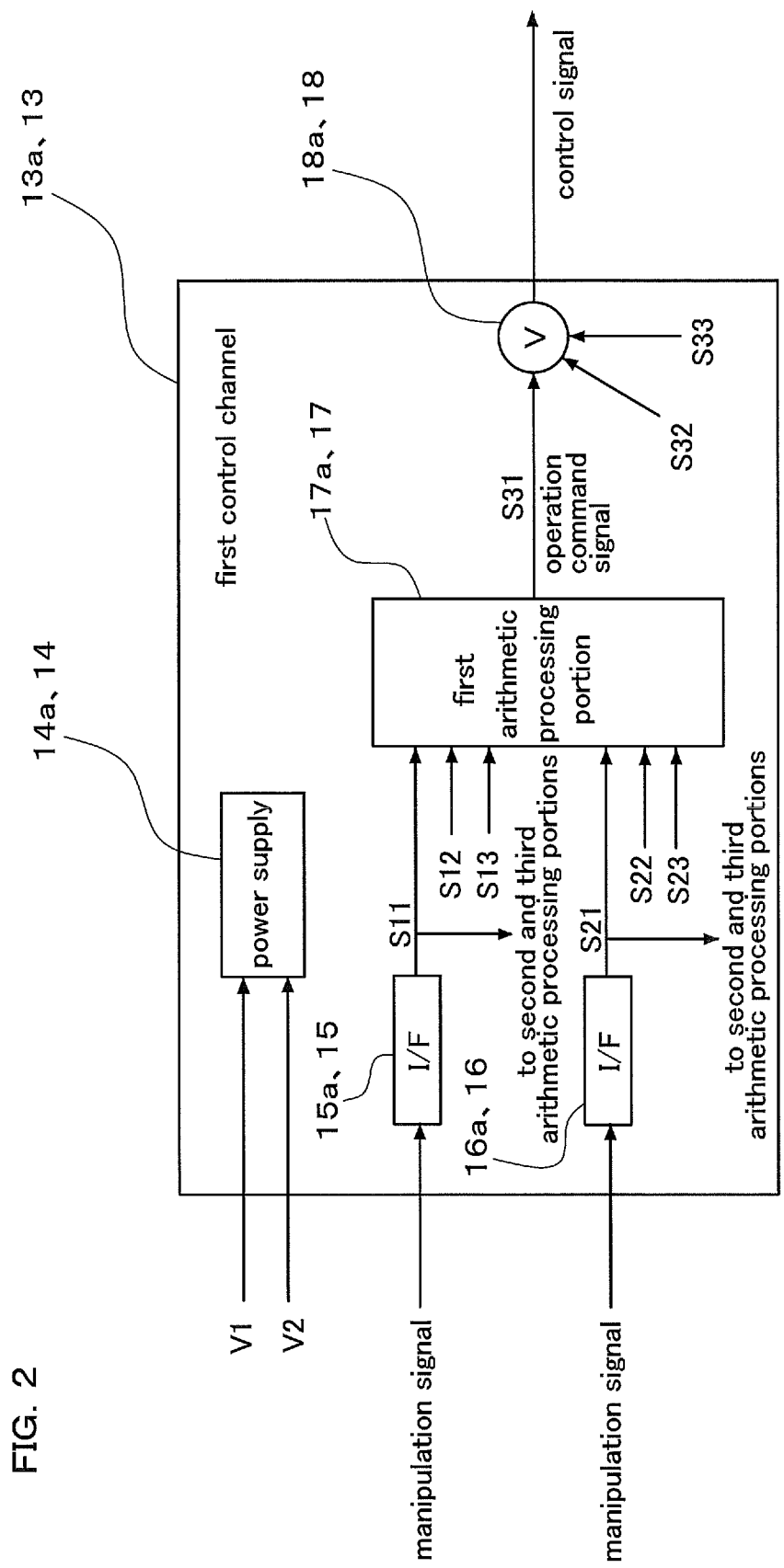
FIG. 2 is a block diagram showing a first control channel of the aircraft control apparatus shown in FIG. 1.
Figure 3:
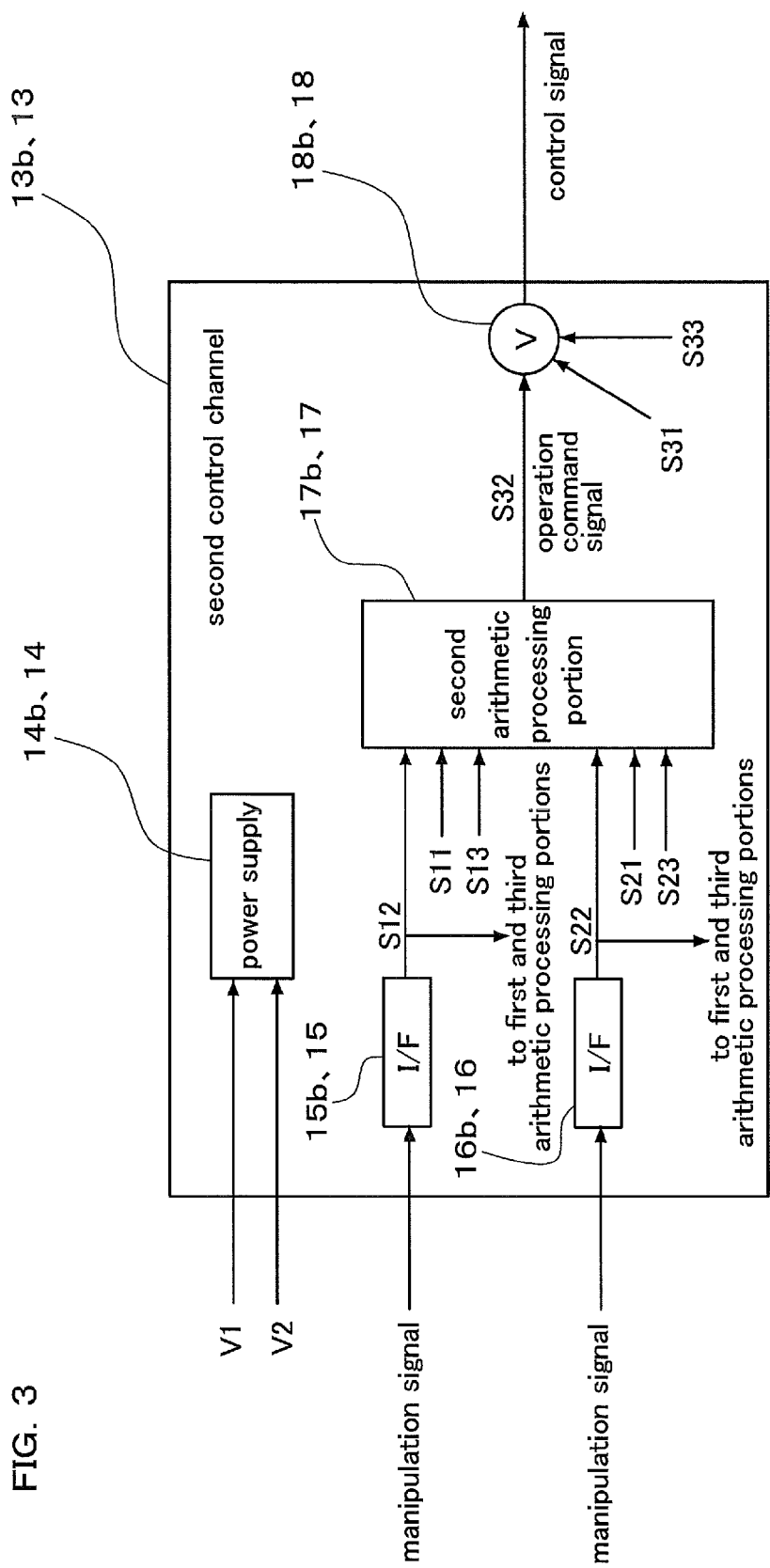
FIG. 3 is a block diagram showing a second control channel of the aircraft control apparatus shown in FIG. 1.
Figure 4:
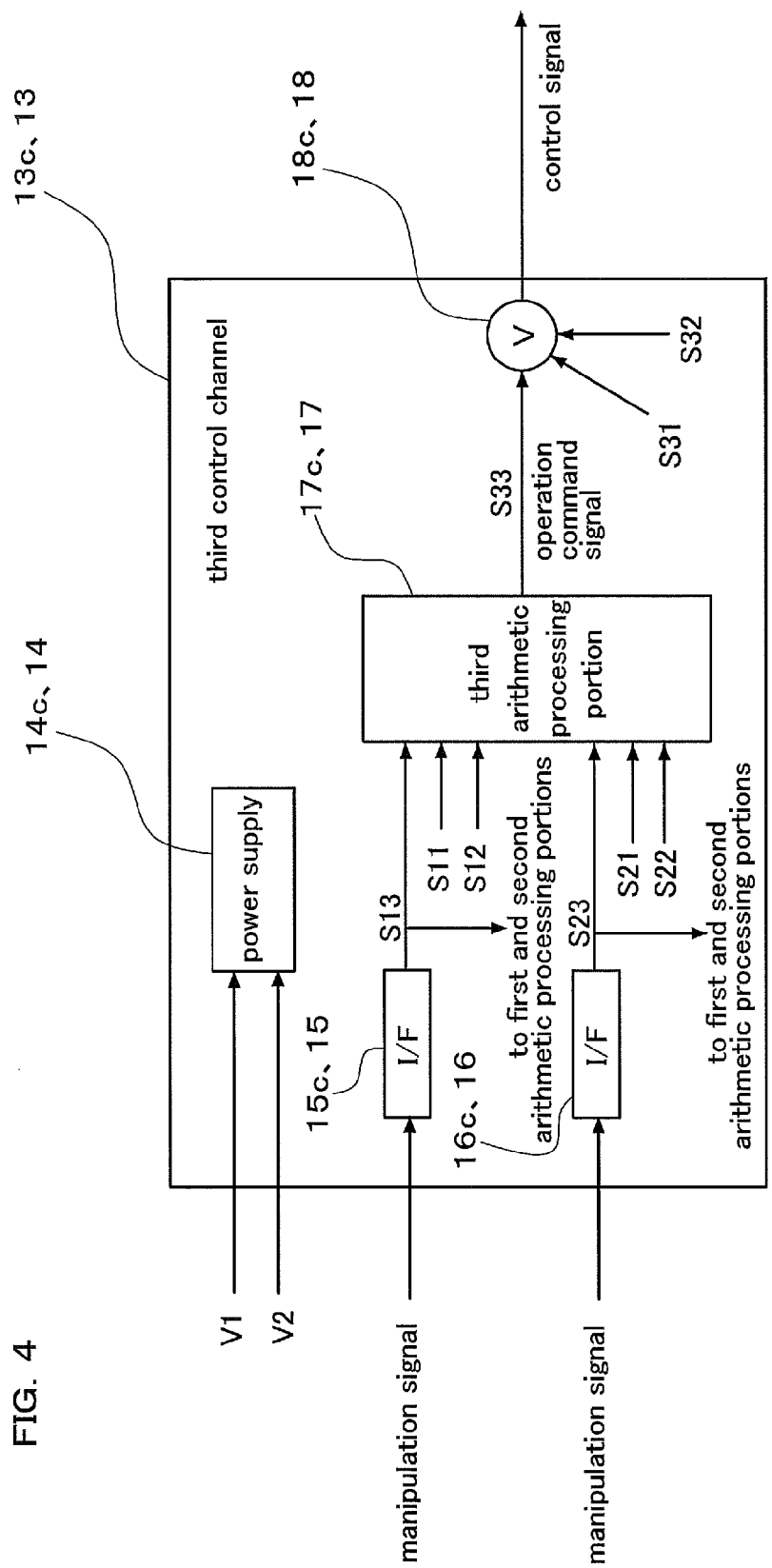
FIG. 4 is a block diagram showing a third control channel of the aircraft control apparatus shown in FIG. 1.
Figure 5:
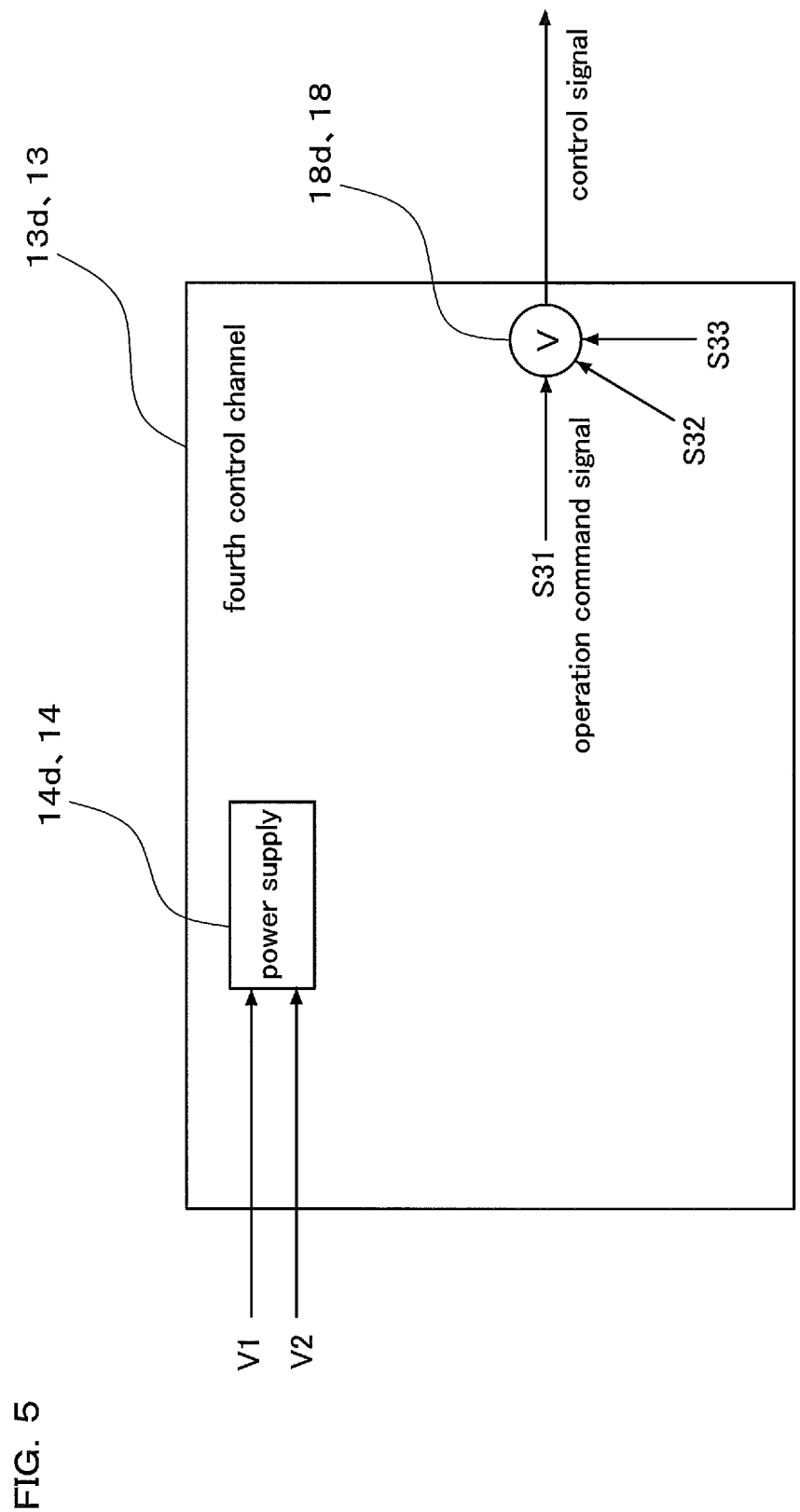
FIG. 5 is a block diagram showing a fourth control channel of the aircraft control apparatus shown in FIG. 1.

The configuration of the control channels 13 will now be described in further detail. FIG. 2 is a block diagram showing the first control channel 13a. FIG. 3 is a block diagram showing the second control channel 13b. FIG. 4 is a block diagram showing the third control channel 13c. FIG. 5 is a block diagram showing the fourth control channel 13d.

As shown in FIGS. 1 to 5, the first to third control channels (13a, 13b, 13c) each include a power supply 14, interfaces (15, 16), an arithmetic processing portion 17, and a signal determination unit 18 in this embodiment. On the other hand, the fourth control channel 13d includes a power supply 14 and a signal determination unit 18. That is, in this embodiment, part of the plurality of (three) control channels (13a, 13b, 13c), rather than all of the plurality of (four) control channels (13a, 13b, 13c, 13d), each include the interfaces (15, 16) and the arithmetic processing portion 17. Further, three control channels 13 in each of which the arithmetic processing portion 17 is provided are provided in this embodiment.

Note that power supplies (14a, 14b, 14c, 14d) are provided as the power supplies 14. Interfaces (15a, 15b, 15c) are provided as the interfaces 15. Interfaces (16a, 16b, 16c) are provided as the interfaces 16. A first arithmetic processing portion 17a, a second arithmetic processing portion 17b, and a third arithmetic processing portion 17c are provided as the arithmetic processing portions 17. Signal determination units (18a, 18b, 18c, 18d) are provided as the signal determination units 18.

The first control channel 13a includes the power supply 14a, the interface 15a, the interface 16a, the first arithmetic processing portion 17a, and the signal determination unit 18a.

The power supply 14a is provided as a power supply for supplying control power to the actuators (11a, 12a), the first arithmetic processing portion 17a, and so forth. Further, power is supplied to the power supply 14a from each of two systems of a power supply that is installed at the center of the body of the aircraft 100 as a main power supply on the upstream side of a power supply path. In FIG. 2 (similarly in FIGS. 3 to 5), an exemplary configuration is shown that enables power of a voltage V1 to be supplied from one of the systems of the main power supply and power of a voltage V2 to be supplied from the other system of the main power supply to the power supply 14a (14).

Also, the power supply 14a supplies one of the two systems of power supplied from the main power supply to the first arithmetic processing portion 17a and so forth. For example, the power supply 14a compares the voltage V1 and the voltage V2, selects the power of a higher voltage, and supplies that power to the actuators (11a, 12a) and so forth. Alternatively, the power supply 14a may include a supply power selector switch, and may be configured to selectively supply power of the voltage V1 and power of the voltage V2 to the actuators (11a, 12a) and so forth at a predetermined timing.

The interface 15a is provided as an interface that receives a manipulation signal generated by the position sensor 107a based on a manipulation of the wheel 106 performed by the pilot. The manipulation signal that has been input into the interface 15a is input as a manipulation signal S11 into the first arithmetic processing portion 17a, and also input into the second arithmetic processing portion 17b of the second control channel 13b and the third arithmetic processing portion 17c of the third control channel 13c. Note that the manipulation signal S11 is transmitted to the second arithmetic processing portion 17b and the third arithmetic processing portion 17c via a data bus not shown.

The interface 16a is provided as an interface that receives a manipulation signal generated by the position sensor 109a based on a manipulation of the speed brake lever 108 performed by the pilot. The manipulation signal that has been input into the interface 16a is input as a manipulation signal S21 into the first arithmetic processing portion 17a, and also input into the second arithmetic processing portion 17b and the third arithmetic processing portion 17c. Note that the manipulation signal S21 is transmitted to the second arithmetic processing portion 17b and the third arithmetic processing portion 17c via a data bus not shown.

The first arithmetic processing portion 17a is configured as an arithmetic processing unit such as an FPGA (Field-Programmable Gate Array) or a processor. The first arithmetic processing portion 17a calculates and generates an operation command signal S31 for commanding and controlling the operation of the actuators (11, 12) that drive the flight spoilers (102, 103), based on the manipulation signals (S11, S21) received via the interfaces (15a, 16a). The operation command signal S31 may be configured, for example, as a signal commanding the operating positions of the actuators (11, 12).

The first arithmetic processing portion 17a is also configured to execute processing for calculating an operation command signal S31 for commanding and controlling the operation of the actuators (11, 12), based on manipulation signals (S12, S22) received via interfaces (15b, 16b) described below. Furthermore, the first arithmetic processing portion 17a is also configured to execute processing for calculating an operation command signal S31 for commanding and controlling the operation of the actuators (11, 12), based on manipulation signals (S13, S23) received via interfaces (15c, 16c) described below.

Also, the first arithmetic processing portion 17a compares the operation command signal S31 derived from the manipulation signals (S11, S21), the operation command signal S31 derived from the manipulation signals (S12, S22), and the operation command signal S31 derived from the manipulation signals (S13, S23). Accordingly, the first arithmetic processing portion 17a is configured to be capable of monitoring and detecting the abnormality of the operation command signal S31 derived from the manipulation signals (S11, S21).

The signal determination unit 18a is configured, for example, as an analog circuit such as an operational amplifier. Also, the signal determination unit 18a is provided as a voter that performs voting for determining a control signal for finally controlling the operation of the actuators (11a, 12a) based on the operation command signal S31 generated by the first arithmetic processing portion 17a and other signals, and outputting the determined control signal.

Specifically, the signal determination unit 18a receives a first operation command signal S31, which is the operation command signal S31 generated by the first arithmetic processing portion 17a provided in the first control channel 13a in which the signal determination unit 18a is provided, and second operation command signals (S32, S33). The second operation command signals (S32, S33) are configured as operation command signals (S32, S33) generated by the arithmetic processing portions (17b, 17c) provided in the other control channels (13b, 13c) described below that are different from the first control channel 13a in which the signal determination unit 18a is provided. Then, by comparing the first operation command signal S31 and the second operation command signals (S32, S33) as the other signals described above, the signal determination unit 18a determines a control signal for finally controlling the operation of the actuators (11a, 12a) and outputs the determined control signal. Note that the second operation command signals (S32, S33) are transmitted from the second processing portion 17b and the third processing portion 17c via a data bus not shown, and received by the first arithmetic processing portion 17a.

The signal determination unit 18a may perform various types of processing to compare the first operation command signal S31 and the second operation command signals (S32, S33) and determine the above-described control signal. For example, the signal determination unit 18a may determine one of the first operation command signal S31, the second operation command signal S32, and the second operation command signal S33 that has a medium value of the magnitudes of signal output as the above-described control signal. Alternatively, the signal determination unit 18a may calculate an average value of the magnitudes of signal output of the first operation command signal S31, the second operation command signal S32, and the second operation command signal S33, and determine a signal of the calculated average as the above-described control signal. Alternatively, the signal determination unit 18a may compare two of the first operation command signal S31, the second operation command signal S32, and the second operation command signal S33, and determine the remaining one signal as the above-described control signal if it is determined that there is the possibility that the value of the output of one of the compared two signals is abnormal.

As described above, when a control signal for finally controlling the operation of the actuators (11a, 12a) has been determined by the signal determination unit 18a, the determined control signal is output from the first control channel 13a. Then, the operation of the actuators (11a, 12a) will be controlled based on the control signal.

The second control channel 13b includes the power supply 14b, the interface 15b, the interface 16b, the second arithmetic processing portion 17b, and the signal determination unit 18b.

The power supply 14b is provided as a power supply for supplying control power to the actuators (11b, 12b), the second arithmetic processing portion 17b, and so forth. Note that the power supply 14b is configured in the same manner as the power supply 14a of the first control channel 13a, and therefore the detailed description thereof has been omitted.

The interface 15b is provided as an interface that receives a manipulation signal generated by the position sensor 107b based on a manipulation of the wheel 106 performed by the pilot. The manipulation signal that has been input into the interface 15b is input as a manipulation signal S12 into the second arithmetic processing portion 17b, and also input into the first arithmetic processing portion 17a and the third arithmetic processing portion 17c. Note that the manipulation signal S12 is transmitted to the first arithmetic processing portion 17a and the third arithmetic processing portion 17c via a data bus not shown.

The interface 16b is provided as an interface that receives a manipulation signal generated by the position sensor 109b based on a manipulation of the speed brake lever 108 performed by the pilot. The manipulation signal that has been input into the interface 16b is input as a manipulation signal S22 into the second arithmetic processing portion 17b, and also input into the first arithmetic processing portion 17a and the third arithmetic processing portion 17c. Note that the manipulation signal S22 is transmitted to the first arithmetic processing portion 17a and the third arithmetic processing portion 17c via a data bus not shown.

The second arithmetic processing portion 17b is configured as an arithmetic processing unit such as an FPGA (Field-Programmable Gate Array) or a processor. The second arithmetic processing portion 17b calculates and generates an operation command signal S32 for commanding and controlling the operation of the actuators (11, 12) that drive the flight spoilers (102, 103), based on the manipulation signals (S12, S22) received via the interfaces (15b, 16b). The operation command signal S32 may be configured, for example, as a signal commanding the operating positions of the actuators (11, 12) as with the operation command signal S31.

The second arithmetic processing portion 17b is also configured to execute processing for calculating an operation command signal S32 for commanding and controlling the operation of the actuators (11, 12), based on the manipulation signals (S11, S21) received via the interfaces (15a, 16a). Furthermore, the second arithmetic processing portion 17b is also configured to execute processing for calculating an operation command signal S31 for commanding and controlling the operation of the actuators (11, 12), based on the manipulation signals (S13, S23) received via the interfaces (15c, 16c).

Also, the second arithmetic processing portion 17b compares the operation command signal S32 derived from the manipulation signals (S12, S22), the operation command signal S32 derived from the manipulation signals (S11, S21), and the operation command signal S32 derived from the manipulation signals (S13, S23). Accordingly, the second arithmetic processing portion 17b is configured to be capable of monitoring and detecting the abnormality of the operation command signal S32 derived from the manipulation signals (S12, S22).

The signal determination unit 18b is configured, for example, as an analog circuit such as an operational amplifier. Also, the signal determination unit 18b is provided as a voter that performs voting for determining a control signal for finally controlling the operation of the actuators (11b, 12b) based on the operation command signal S32 generated by the second arithmetic processing portion 17b and other signals, and outputting the determined control signal.

Specifically, the signal determination unit 18b receives a first operation command signal S32, which is the operation command signal S32 generated by the second arithmetic processing portion 17b provided in the second control channel 13b in which the signal determination unit 18b is provided, and second operation command signals (S31, S33). The second operation command signals (S31, S33) are configured as operation command signals (S31, S33) generated by the arithmetic processing portions (17a, 17c) provided in the other control channels (13a, 13c) that are different from the second control channel 13b in which the signal determination unit 18b is provided. Then, by comparing the first operation command signal S32 and the second operation command signals (S31, S33) as the other signals described above, the signal determination unit 18b determines a control signal for finally controlling the operation of the actuators (11b, 12b) and outputs the determined control signal. Note that the second operation command signals (S31, S33) are transmitted from the first arithmetic processing portion 17a and the third arithmetic processing portion 17c via a data bus not shown, and received by the second arithmetic processing portion 17b.

The signal determination unit 18b may perform the same processing as that performed by the signal determination unit 18a provided in the first control channel 13a to compare the first operation command signal S32 and the second operation command signals (S31, S33) and determine the above-described control signal.

As described above, when a control signal for finally controlling the operation of the actuators (11b, 12b) has been determined by the signal determination unit 18b, the determined control signal is output from the second control channel 13b. Then, the operation of the actuators (11b, 12b) will be controlled based on the control signal.

The third control channel 13c includes the power supply 14c, the interface 15c, the interface 16c, the third arithmetic processing portion 17c, and the signal determination unit 18c.

The power supply 14c is provided as a power supply for supplying control power to the actuators (11c, 12c), the third arithmetic processing portion 17c, and so forth. Note that the power supply 14c is configured in the same manner as the power supply 14a of the first control channel 13a, and therefore the detailed description thereof has been omitted.

The interface 15c is provided as an interface that receives a manipulation signal generated by the position sensor 107c based on a manipulation of the wheel 106 performed by the pilot. The manipulation signal that has been input into the interface 15c is input as a manipulation signal S13 into the third arithmetic processing portion 17c, and also input into the first arithmetic processing portion 17a and the second arithmetic processing portion 17b. Note that the manipulation signal S13 is transmitted to the first arithmetic processing portion 17a and the second arithmetic processing portion 17b via a data bus not shown.

The interface 16c is provided as an interface that receives a manipulation signal generated by the position sensor 109c based on a manipulation of the speed brake lever 108 performed by the pilot. The manipulation signal that has been input into the interface 16c is input as a manipulation signal S23 into the third arithmetic processing portion 17c, and also input into the first arithmetic processing portion 17a and the second arithmetic processing portion 17b. Note that the manipulation signal S23 is transmitted to the first arithmetic processing portion 17a and the second arithmetic processing portion 17b via a data bus not shown.

The third arithmetic processing portion 17c is configured as an arithmetic processing unit such as an FPGA (Field-Programmable Gate Array) or a processor. The third arithmetic processing portion 17c calculates and generates an operation command signal S33 for commanding and controlling the operation of the actuators (11, 12) that drive the flight spoilers (102, 103), based on the manipulation signals (S13, S23) received via the interfaces (15c, 16c). The operation command signal S33 may be configured, for example, as a signal commanding the operating positions of the actuators (11, 12) as with the operation command signal S31.

The third arithmetic processing portion 17c is also configured to execute processing for calculating an operation command signal S33 for commanding and controlling the operation of the actuators (11, 12), based on the manipulation signals (S11, S21) received via the interfaces (15a, 16a). Furthermore, the third arithmetic processing portion 17c is also configured to execute processing for calculating an operation command signal S33 for commanding and controlling the operation of the actuators (11, 12), based on the manipulation signals (S12, S22) received via the interfaces (15b, 16b).

Also, the third arithmetic processing portion 17c compares the operation command signal S33 derived from the manipulation signals (S13, S23), the operation command signal S33 derived from the manipulation signals (S11, S21), and the operation command signal S33 derived from the manipulation signals (S12, S22). Accordingly, the third arithmetic processing portion 17c is configured to be capable of monitoring and detecting the abnormality of the operation command signal S33 derived from the manipulation signals (S13, S23).

The signal determination unit 18c is configured, for example, as an analog circuit such as an operational amplifier. Also, the signal determination unit 18c is provided as a voter that performs voting for determining a control signal for finally controlling the operation of the actuators (11c, 12c) based on the operation command signal S33 generated by the third arithmetic processing portion 17c and other signals, and outputting the determined control signal.

Specifically, the signal determination unit 18c receives a first operation command signal S33, which is the operation command signal S33 generated by the third arithmetic processing portion 17c provided in the third control channel 13c in which the signal determination unit 18c is provided, and second operation command signals (S31, S32). The second operation command signals (S31, S32) are configured as operation command signals (S31, S32) generated by the arithmetic processing portions (17a, 17b) provided in the other control channels (13a, 13c) that are different from the third control channel 13c in which the signal determination unit 18c is provided. Then, by comparing the first operation command signal S33 and the second operation command signals (S31, S32) as the other signals described above, the signal determination unit 18c determines a control signal for finally controlling the operation of the actuators (11c, 12c) and outputs the determined control signal. Note that the second operation command signals (S31, S32) are transmitted from the first arithmetic processing portion 17a and the second arithmetic processing portion 17b via a data bus not shown, and received by the third arithmetic processing portion 17c.

The signal determination unit 18c may perform the same processing as that performed by the signal determination unit 18a provided in the first control channel 13a to compare the first operation command signal S33 and the second operation command signals (S31, S32) and determine the above-described control signal.

As described above, when a control signal for finally controlling the operation of the actuators (11c, 12c) has been determined by the signal determination unit 18c, the determined control signal is output from the third control channel 13c. Then, the operation of the actuators (11c, 12c) will be controlled based on the control signal.

As described above, in the aircraft control apparatus 1, the signal determination units 18 respectively provided in the plurality of control channels 13 (13a, 13b, 13c) receive the first operation command signal and the second operation command signals. The first operation command signal is configured as an operation command signal generated by the arithmetic processing portion 17 provided in the control channel 13 in which each signal determination unit 18 is provided. The second operation command signals are configured as operation command signals generated by the arithmetic processing portions 17 provided in other control channels 13 different from the control channel 13 in which each signal determination unit 18 is provided. Also, each signal determination unit 18 determines a control signal by comparing the first operation command signal and the second operation command signals, and outputs the determined control signal.

Furthermore, in the aircraft control apparatus 1, the arithmetic processing portions 17 (17a, 17b, 17c) respectively provided in the plurality of control channels 13 (13a, 13b, 13c) have designs that are different from one another. Examples of the configurations in which the arithmetic processing portions 17 of the control channels 13 (13a, 13b, 13c) have designs different from one another include a configuration in which the first arithmetic processing portion 17a, the second arithmetic processing portion 17b, and the third arithmetic processing portion 17c are manufactured by manufactures different from one another. Alternatively, a configuration can be given as an example in which the first arithmetic processing portion 17a, the second arithmetic processing portion 17b, and the third arithmetic processing portion 17c were developed at different times and are thus of different development generations. Further, it is also possible to adopt a combination in which any of the first arithmetic processing portion 17a, the second arithmetic processing portion 17b, and the third arithmetic processing portion 17c is configured as an FPGA and any of the others is configured as a processor.

A specific example will now be given of the manufacturer, the series name, and the model number of each of the first to third arithmetic processing portions (17a, 17b, 17c). In the specific example, for example, one of the first to third arithmetic processing portions (17a, 17b, 17c) is manufactured by the manufacturer "Actel" under the series name "ProASIC3" and the model number "3PE1500", one of the others is manufactured by the manufacturer "Altera" under the series name "Cyclone III" and the model number "EP3C25", and the remaining one is manufactured by the manufacturer "Xilinx" under the series name "Virtex-5" and the model number "XQ5VLX155T".

Finally, a description will now be given of the fourth control channel 13d. The fourth control channel 13d includes the power supply 14d and the signal determination unit 18d. The power supply 14d is provided as a power supply for supplying control power to the actuators (11d, 12d) and so forth. Note that the power supply 14d is configured in the same manner as the power supply 14a of the first control channel 13a, and therefore the detailed description thereof has been omitted.

The signal determination unit 18d is configured, for example, as an analog circuit such as an operational amplifier. Also, the signal determination unit 18d is provided as a voter that performs voting for determining a control signal for finally controlling the operation of the actuators (11d, 12d) based on the operation command signal S31 generated by the first arithmetic processing portion 17a, the operation command signal S32 generated by the second arithmetic processing portion 17b, and the operation command signal S33 generated by the third arithmetic processing portion 17c, and outputting the determined control signal.

Note that the operation command signal S31, the operation command signal S32, and the operation command signal S33 are transmitted from the first arithmetic processing portion 17a, the second arithmetic processing portion 17b, and the third arithmetic processing portion 17c via a data bus not shown, and received by the signal determination unit 18d. Also, the signal determination unit 18d may perform the same processing as that performed by the signal determination unit 18a provided in the first control channel 13a to compare the operation command signal S31, the operation command signal S32, and the operation command signal S33 and determine the above-described control signal.

As described above, when a control signal for finally controlling the operation of the actuators (11d, 12d) has been determined by the signal determination unit 18d, the determined control signal is output from the fourth control channel 13d. Then, the operation of the actuators (11d, 12d) will be controlled based on the control signal.

As described thus far, with the aircraft control apparatus 1, the plurality of control channels 13 (13a, 13b, 13c) are respectively provided in one-to-one correspondence with the arithmetic processing portions 17 (17a, 17b, 17c) having designs different from one another. Also, in the control channels 13 (13a, 13b, 13c), each of the signal determination units 18 (18a, 18b, 18c) determines a control signal by comparing the first operation command signal from the arithmetic processing portion 17 of the control channel 13 in which that signal determination unit 18 is provided and the second operation command signals from the arithmetic processing portion 17 of the other control channels 13, and outputs the determined control signal.

Accordingly, even if the arithmetic processing portion 17 of any of the control channels 13 has failed, the signal determination unit 18 provided in the control channel 13 whose processing portion 17 has failed can determine a control signal based on the operation command signals from the arithmetic processing portions 17 of the other control channels 13, and output the determined control signal. Then, the occurrence of a generic failure that may occur commonly among the same pieces of software or hardware can also be prevented. This prevents a situation where the control channel 13 whose processing portion 18 has failed becomes inoperable. Thus, the redundancy that allows the operation of the flight spoilers (102, 103) to be safely continued can be ensured. With the aircraft control apparatus 1, the control channels 13 are respectively provided in one-to-one correspondence with the arithmetic processing portions 17 having designs different from one another, and therefore it is possible to significantly reduce the number of the arithmetic processing portion 17 as the aircraft control apparatus 1 as a whole.

Furthermore, this can simplify the configuration of the aircraft control apparatus 1, thus achieving a further reduction in the manufacturing costs.

Therefore, according to this embodiment, it is possible to provide an aircraft control apparatus 1 and an aircraft control system 10 for which the redundancy that allows the operation of the flight spoilers (102, 103) to be safely continued can be ensured and whose configuration can be reduced with a decreased number of the arithmetic processing portions 17.

According to this embodiment, three control channels 13 (13a, 13b, 13c) are provided, with the arithmetic processing portions 17 being provided in each of the three control channels 13, and therefore the aircraft control apparatus 1 is provided with three arithmetic processing portions 17 (17a, 17b, 17c) having designs different from one another. Therefore, even if any of the arithmetic processing portions 17 has failed, the signal determination unit 18 can determine a control signal by comparing the operation command signals generated by the remaining two arithmetic processing portions 17, and output the determined control signal. Accordingly, it is possible to further increase the reliability of the aircraft control apparatus 1.

Although an embodiment of the present invention has been described thus far, the present invention is not limited to the above-described embodiment, and various modifications may be made within the scope recited in the claims. For example, the following modifications are possible.

(1) Although the above embodiment has been described, taking, as an example, a flight spoiler serving as a moving surface as a device to which the aircraft control apparatus and the aircraft control system are applied, this need not be the case; the present invention may be applied to another device. For example, the present invention may be applied to a ground spoiler, or an aileron, a rudder, an elevator, or the like serving as a moving surface constituting a control surface. Although the embodiment has been described, taking, as an example, a configuration in which the present invention is configured as a flight control apparatus or a flight control system that controls the operation of a moving surface of an aircraft, this need not be the case; the present invention may also be applied to an apparatus or a system other than a flight control apparatus and a flight control system. For example, the present invention may also be applied to an apparatus or a system that controls the operation of a leg such as a landing gear of an aircraft.

(2) Although the above embodiment has been described, taking, as an example, a configuration in which part of the plurality of control channels each include an interface, an arithmetic processing portion, and a signal determination unit, this need not be the case. It is also possible to implement a configuration in which all of the control channels each include an interface, an arithmetic processing portion, and a signal determination unit.

(3) Although the above embodiment has been described, taking, as an example, a configuration in which each of the signal determination units determines the control signal by receiving and comparing operation command signals from all of the arithmetic processing portions, this need not be the case. It is also possible to implement a configuration in which each signal determination unit determines a control signal by receiving and comparing operation command signals from part of the plurality of arithmetic processing portions. As such an example, a configuration will now be described in which four control channels are provided and arithmetic processing portions having designs different from one another are respectively provided in the four control channels. In this case, the signal determination unit of each of the control channels may determine a control signal by receiving an operation command signal from the arithmetic processing portion of the control channel in which that signal determination unit is provided and operation command signals from the arithmetic processing portions of two of the other control channels and comparing the operation command signals, and output the determined control signal. With this configuration, it is possible to reduce the processing load of the arithmetic processing portions. This can relax the required specifications for the processing capability of the arithmetic processing portions, thus achieving a cost reduction.

(4) Although the above embodiment has been described, taking, as an example, a configuration in which four control channels are provided, this need not be the case. It is also possible to implement a configuration in which two or three control channels, or five or more control channels are provided.

(5) The above embodiment has been described, taking, as an example, a configuration in which each of the arithmetic processing portions calculates a plurality of operation command signals, based on a plurality of received manipulation signals, and compare the plurality of operation command signals. Accordingly, each of the arithmetic processing portions is configured to be capable of monitoring and detecting the abnormality of the operation command signal in the above embodiment. However, each of the arithmetic processing portions needs not be provided with the above-described configuration for monitoring the abnormality of the operation command signal, and may be provided with a configuration for monitoring the abnormality of the received manipulation signal. In this case, for example, each of the arithmetic processing portions monitors the abnormality of the manipulation signal by comparing the plurality of received manipulation signals. Each of the arithmetic processing portions is configured to determine a manipulation signal for calculating an operation command signal, based on the results of comparing the plurality of manipulation signals. Furthermore, each of the arithmetic processing portions is configured to calculate an operation command signal, based on the determined manipulation signal described above.

The present invention is widely applicable as an aircraft control apparatus that controls a plurality of actuators that drive a device installed in an aircraft, and an aircraft control system that includes the aircraft control apparatus and a plurality of actuators. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. An aircraft control apparatus that controls a plurality of actuators that drive a device installed in an aircraft, the apparatus comprising:
a plurality of control channels that control the plurality of actuators and each include a power supply for supplying power,
wherein all of the plurality of control channels or part of the plurality of control channels each include:
an interface that receives a manipulation signal generated, based on a manipulation of a pilot flying the aircraft, by a manipulation input unit into which a manipulation of the aircraft performed by the pilot is input;
an arithmetic processing portion that calculates and generates, based on the manipulation signal received via the interface, an operation command signal for commanding and controlling operation of the actuators that drive the device,
a signal determination unit that determines, based on the operation command signal generated by the arithmetic processing portion and another signal, a control signal serving as a signal for finally controlling operation of the actuators, and outputs the control signal,
wherein the arithmetic processing portion provided in each of the plurality of control channels has design different from one another, and
each of the signal determination units respectively provided in the plurality of control channels receives a first operation command signal, which is the operation command signal generated by the arithmetic processing portion provided in the control channel in which that signal determination unit is provided, and a second operation command signal, which is the operation command signal generated by the arithmetic processing portion provided in another of the control channels different from the control channel in which that signal determination unit is provided, determines the control signal by comparing the first operation command signal and the second operation command signal serving as the other signal, and outputs the control signal.

2. The aircraft control apparatus according to claim 1, wherein three or more control channels are provided, the arithmetic processing portion being provided in each of the three or more control channels.

3. An aircraft control system comprising the aircraft control apparatus according to claim 1, and a plurality of actuators that are controlled by the aircraft control apparatus and that drive a device installed in an aircraft.

4. An aircraft control system comprising the aircraft control apparatus according to claim 2, and a plurality of actuators that are controlled by the aircraft control apparatus and that drive a device installed in an aircraft.

5. The aircraft control apparatus according to claim 1, wherein the plurality of control channels includes a first control channel, a second control channel, and a third control channel, where said first control channel is provided with a first arithmetic processing portion, said second control channel is provided with a second arithmetic processing portion, and said third control channel is provided with a third arithmetic processing portion, wherein each of a first, a second, and a third arithmetic processing portions is designed differently from other two.

* * * * *